(12) United States Patent
Ziegenfuss

(10) Patent No.: US 8,016,548 B2
(45) Date of Patent: Sep. 13, 2011

(54) WATER SUPPLY TUNNEL SECONDARY PURPOSE TURBINE ELECTRIC POWER GENERATOR SYSTEM

(75) Inventor: Mark R. Ziegenfuss, Ringoes, NJ (US)

(73) Assignee: Mark R. Ziegenfuss, Ringoes, NJ (US)

( * ) Notice: Subject to any disclaimer, the term of this patent is extended or adjusted under 35 U.S.C. 154(b) by 1197 days.

(21) Appl. No.: 11/731,080

(22) Filed: Mar. 30, 2007

(65) Prior Publication Data

US 2008/0238099 A1 Oct. 2, 2008

(51) Int. Cl.
*F01B 25/26* (2006.01)
*F01D 17/08* (2006.01)

(52) U.S. Cl. ..................... 415/118; 415/149.1
(58) Field of Classification Search .................... 415/26, 415/118, 149.1, 149.2, 150, 151; 290/43, 290/54; 137/487.5, 599.01
See application file for complete search history.

(56) References Cited

U.S. PATENT DOCUMENTS

| | | | |
|---|---|---|---|
| 2,962,599 A | | 9/1957 | Pirkey |
| 3,051,186 A | * | 8/1962 | Fisch et al. ................ 137/627.5 |
| 3,431,735 A | * | 3/1969 | Stauber ........................ 405/75 |
| 3,750,001 A | * | 7/1973 | McCloskey .................... 322/35 |
| 4,109,160 A | * | 8/1978 | Goto et al. .................... 290/52 |
| 4,192,627 A | | 3/1980 | Casebow |
| 4,246,753 A | * | 1/1981 | Redmond ....................... 60/398 |
| 4,272,686 A | | 6/1981 | Suzuki |
| 4,284,900 A | | 8/1981 | Botts |
| 4,496,845 A | * | 1/1985 | Ensign et al. .................. 290/43 |
| 6,000,880 A | * | 12/1999 | Halus ........................... 405/52 |
| 6,357,235 B1 | | 3/2002 | Cerro |
| 6,396,162 B1 | * | 5/2002 | Carrillo ........................ 290/43 |
| 6,880,567 B2 | * | 4/2005 | Klaver et al. .............. 137/487.5 |
| 6,969,925 B2 | * | 11/2005 | Desy et al. ..................... 290/54 |
| 7,069,802 B2 | | 7/2006 | Mikhail et al. |
| 7,097,113 B2 | * | 8/2006 | Ivans ............................. 239/1 |

* cited by examiner

*Primary Examiner* — Edward Look
*Assistant Examiner* — Sean J Younger
(74) *Attorney, Agent, or Firm* — Deirdra M. Meagher

(57) ABSTRACT

A water supply tunnel secondary purpose turbine electric power generator system includes: a.) a water supply subsystem with a water source at an elevation that is at least 300 feet above the mean altitude of a community, that includes a gravity fed underground water tunnel being located, at least in part, upstream from the community, and, at least in part, being located under the community. There is a plurality of riser conduits in the community connected to the gravity fed underground water tunnel, delivering water from the water source to the community at a pressure that is at least 100 psi in excess of desired water pressure delivered to community water lines; b.) water valving subsystems connected to each of the riser conduits and one of each including at least one safety valve, to lower water pressure of the delivered water; and, c.) a power generating turbine subsystem, including at least one water driven turbine located in at least one of the water supply subsystem and water valving subsystem.

20 Claims, 8 Drawing Sheets

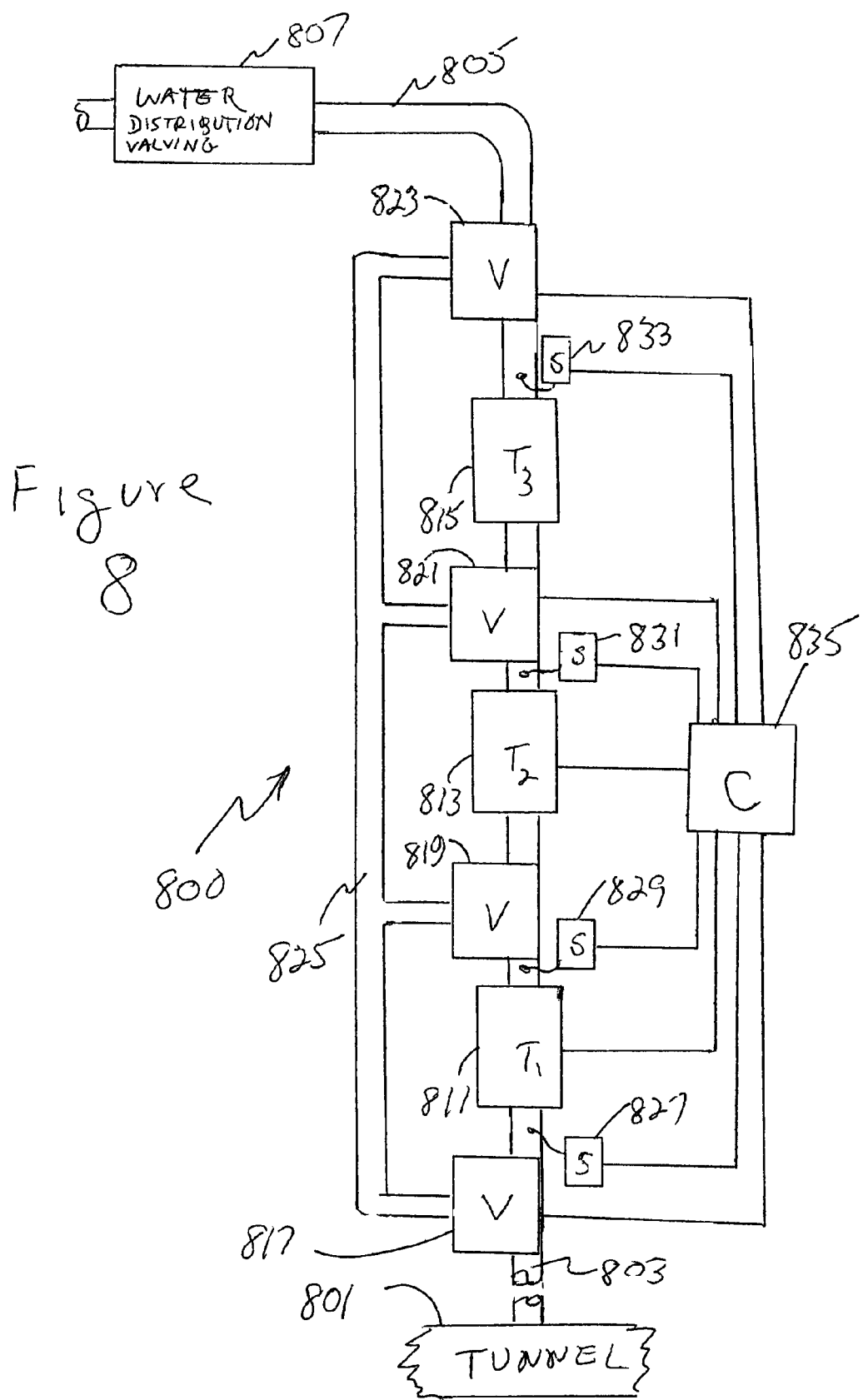

WATER SUPPLY TUNNEL SECONDARY PURPOSE TURBINE ELECTRIC POWER GENERATOR SYSTEM

BACKGROUND OF INVENTION a. Field of Invention

The invention relates generally to the secondary use of water supply flow from man-made tunnel riser conduits to generate electricity using water driven turbines. This invention is particularly applicable to both new projects and to retrofit of water supply systems with tunnels and riser conduits already in place, e.g., the new water supply system of the Boro of Manhattan, New York City.

b. Description of Related Art

The following patents are representative of various power generation systems involving hydropower:

U.S. Pat. No. 7,069,802 B2 to Mikhail et al. describes an electric power-generating device with a rotor turned by an external source of energy, such as wind or water currents. The rotor is coupled to a main shaft. A pair of bull gears is located on the main shaft. A number of intermediate gears are located around a perimeter of the bull gears. An intermediate gear is connected to an input shaft having a double helix pinion that engages the pair of bull gears. The other intermediate gears are similarly connected to respective input shafts having double helix pimons that engage the pair of bull gears. A plurality of output shafts is provided. An output shaft has a single-helix output pinion that engages two adjacent intermediate gears. The other output shafts are similarly connected to respective adjacent intermediate gears. A number of rotational devices are connected to the output shafts.

U.S. Pat. No. 6,357,235 B1 to Cerro describes a system for managing large fluid flows at high pressures. This system consists of an elemental chamber the operation of which is based on energy transmission by "impact" resulting from the instantaneous discharge of a "motor fluid" at a given pressure to generate a "linear" movement that raises pressure and propels fluid. This system provides an increase in working fluid pressure more efficiently that any presently available system, thanks to the linear transmission of energy, making it highly efficient. The combined arrangement of these chambers allows the managing of high fluid flows at high pressures. This system permits power to be produced through a steam cycle without the need for a phase change, eliminating all condensation and pre-heating stage devices that are replaced by more efficient equipment not requiring the phase change. Thus there is a considerable decrease in the use of fuel, environmental pollution, toxic fumes and thermal pollution, obtaining energy at lower costs.

U.S. Pat. No. 4,284,900 to Botts describes an energy conversion system utilizing gravity flow of water from a high elevation to sea level utilizing gravity to provide large pressure gradients in pipe lines as large quantities of water move from a high elevation at low pressure to low elevations at high pressure and then move under controlled conditions to low atmosphere pressure to operate electrical generators to generate large amounts of electrical current which can be effectively used for electrolysis separation of large volumes of hydrogen gas and oxygen from water and for other purposes. The water can be used for direct consumption, irrigation in agricultural areas, industrial use, fresh water aquaculture, stored in mass volume for future needs in aquifers or for any other purpose for which fresh water may be used for human needs either directly or indirectly with the fresh unpolluted water being easily conveyed into populated plains and coastal regions where such regions lay between wet mountainous regions and sea coasts or any other such area that would be at a sufficiently lower elevation to receive flow by gravity. Large volumes of electrical energy may be produced by the flow rate and differential pressure across hydroelectrical turbine blades whether by in-line direct methods or turbine tip high leverage systems both of which are well-known in this field. The separation of large volumes of hydrogen and oxygen gas by electrolysis methods provides a clean burning energy source which can be provided at various locations adjacent use sites. The natural weather cycle provides a plentiful supply of water at high elevations in those geographical areas in which the present system is used and thus provides a self-perpetuating, closed loop system using gravity as the source of energy for the operation of the system.

U.S. Pat. No. 4,272,686 to Suzuki describes an improved electric power plant which includes a water turbine and a drive wheel contained within a housing for converting hydraulic energy to electrical energy. The housing includes openings for connecting the power plant to a water line or to a sewer line for operating the turbine in either an undershoot or overshoot condition. A plurality of reversible vanes are removably attached to the perimeter of the water turbine for operating the turbine in either an undershoot or overshoot condition. A bypass line extends from the inlet pipe to the housing to the outlet pipe to provide a means for repairing the power plant without interrupting water or sanitary sewer service. The main electrical generator is energized through a belt driven by its engagement with the drive wheel. Ultraviolet ray lights and an ozone generator are included within the housing to eliminate bacteria and to reduce odors. A plurality of the power plants may be connected to a central power distribution center for the storage and distribution of the electricity generated by this plant.

U.S. Pat. No. 4,192,627 describes a continuous water flow from selected ones of a plurality of reservoirs which passes through turbines or the like within a hydroelectric power station to produce electrical power. The reservoirs are cyclically filled and evacuated through the power station by operation of a plurality of gates interconnecting reservoirs having different water height levels and an adjacent source of tidal waters. By programmed operation of the gates a continuous water pressure head can be maintained at the power station to assure continuous electrical power generation.

U.S. Pat. No. 2,962,599 to F. Z. Pirkey describes a pump turbine house comprising a pump turbine, a motor generator set connected to said pump turbine, a penstock, an afterbay, means for directing fluid from said penstock into said pump turbine to cause rotation thereof in a predetermined direction of rotation whereby electrical energy is generated by said motor generator set, means for guiding fluid from said afterbay into said pump turbine to be pumped thereby into said penstock by said pump turbine while rotating said pump turbine in said same predetermined direction of rotation whereby electrical energy is absorbed by said motor generator set, means for supplying electrical energy to said motor generator set from an external source whereby said pump turbine is rotated in said predetermined direction of rotation and whereby fluid is urged from said afterbay through said pump turbine and into said penstock, and remote means for rendering operative said fluid directing means and said fluid guiding means in alternate fashion.

Notwithstanding the prior art, the present invention is neither taught nor rendered obvious thereby.

SUMMARY OF INVENTION

The present invention is a water supply tunnel secondary purpose turbine electric power generator system. It involves the secondary use of pressure differentials for generation of electric power through water driven turbines in water supply systems that include underground tunnels located under a community and riser conduits to feed the community water system. The present invention system includes: a.) a water supply subsystem for a community that includes a water source at an elevation that is at least 300 feet above the mean altitude of the community, the water supply subsystem including delivery means for water from the water source to the community that includes a gravity fed underground water tunnel being located, at least in part, upstream from the community, and, at least in part, being located under the community, the water supply subsystem having a plurality of riser conduits in the community connected to the gravity fed underground water tunnel, the riser conduits delivering water from the water source to the community at a pressure that is at least 100 psi in excess of desired water pressure delivered to community water lines; b.) a plurality of water valving subsystems, one of each being connected to each of the riser conduits and one of each including at least one safety valve to lower water pressure of the delivered water; and, c.) a power generating turbine subsystem, including at least one water driven turbine located in at least one of the water supply subsystem and water valving subsystem. By "valving subsystem" is meant all of the piping, valves, controls and connected equipment upstream from the riser conduits. It would typically include any brakes, reducers and valves relating to control of the water from the riser conduits as well as any normal downstream piping and components.

In some preferred embodiments of the present invention water supply tunnel secondary purpose turbine electric power generator system, the water pressure within the tunnel at least in its part being located under the community is at least 600 psi. In some preferred embodiments of the present invention water supply tunnel secondary purpose turbine electric power generator system, the water pressure immediately upstream from each of the water valving subsystems is in excess of 300 psi, that is, the pressure at the tops of the riser conduits. In some preferred embodiments of the present invention water supply tunnel secondary purpose turbine electric power generator system, the water pressure downstream from at least one downstream underwater turbine is less than 100 psi.

In some preferred embodiments of the present invention water supply tunnel secondary purpose turbine electric power generator system, the at least one water driven turbine is located downstream from the at least one safety valve in the water valving subsystem.

In some preferred embodiments of the present invention water supply tunnel secondary purpose turbine electric power generator system, the power generating turbine subsystem includes a plurality of water driven turbines located in at least one of the water supply subsystem and the water valving subsystems.

In some preferred embodiments of the present invention water supply tunnel secondary purpose turbine electric power generator system, the at least one water driven turbine includes a dedicated upstream inlet valve.

In some preferred embodiments of the present invention water supply tunnel secondary purpose turbine electric power generator system, the system further includes a computerized monitoring and control system that includes pressure sensors located within the water valving subsystems and is programmed to automatically valve down water flow in response to sensing a water pressure that exceeds a predetermined threshold pressure. In some preferred embodiments of the present invention water supply tunnel secondary purpose turbine electric power generator system, the computerized monitoring and control system includes at least one sensor downstream from each of the at least one turbine and includes at least one sensor upstream from each of the at least one turbine. In some preferred embodiments of the present invention water supply tunnel secondary purpose, turbine electric power generator system, the water valving subsystems include at least one master breaking valve downstream from each of the at least one turbine.

While the foregoing is discussed in conjunction with at least one turbine, and systems with one turbine is well within the vision of the present invention, it is contemplated that most preferred systems will have a plurality of turbines and these may be in parallel or in series and may be manifolded with separate controls. Thus, the present invention water supply tunnel secondary purpose turbine electric power generator system includes: a.) a water supply subsystem for a community that includes a water source at an elevation that is at least 300 feet above the mean altitude of the community, and preferably at least 500 feet above the mean altitude of the community, the water supply subsystem including delivery means for water from the water source to the community that includes a gravity fed underground water tunnel being located, at least in part, upstream from the community, and, at least in part, being located under the community, the water supply subsystem having a plurality of riser conduits in the community connected to the gravity fed underground water tunnel, the riser conduits delivering water from the water source to the community at a pressure that is at least 100 psi in excess of desired water pressure delivered to community water lines; b.) a water valving subsystem connected to each of the riser conduits and including at least one safety valve to lower water pressure of the delivered water; and, c.) a power generating turbine subsystem, including at least one set of a plurality of water driven turbines located in at least one of the water supply subsystem and the water valving subsystem, each of the at least one set being connected in series or in parallel to one component selected from the group consisting of the underground water tunnel, one of the riser conduits, and one of the riser conduit valving subsystems.

In some preferred embodiments of this present invention water supply tunnel secondary purpose turbine electric power generator system, the water pressure within the tunnel at least in its part being located under the community is at least 600 psi. Likewise, the water pressure immediately upstream from each of the water valving subsystems is in excess of 300 psi. Likewise, the water pressure downstream from at least one downstream under water turbine is less than 100 psi.

In some preferred embodiments of the present invention water supply tunnel secondary purpose turbine electric power generator system, the at least one water driven turbine is located downstream from the at least one safety valve in the water valving subsystems.

In some preferred embodiments of the present invention water supply tunnel secondary purpose turbine electric power generator system, the power generating turbine subsystem includes a plurality of water driven turbines located in at least one of the water supply subsystem and water valving subsystems.

In some preferred embodiments of the present invention water supply tunnel secondary purpose turbine electric power generator system, the at least one water driven turbine includes a dedicated upstream inlet valve.

In some preferred embodiments of the present invention water supply tunnel secondary purpose turbine electric power generator system, the system further includes a computerized monitoring and control system that includes pressure sensors located within the water valving subsystem and is programmed to automatically valve down water flow in response to sensing a water pressure that exceeds a predetermined threshold pressure. In some preferred embodiments of the present invention water supply tunnel secondary purpose turbine electric power generator system, the computerized monitoring and control system includes at least one sensor downstream from each of the at least one turbine and includes at least one sensor upstream from each of the at least one turbine. In some preferred embodiments of the present invention water supply tunnel secondary purpose turbine electric power generator system, the water valving subsystem includes at least one master-breaking valve downstream from each of the at least one turbine.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
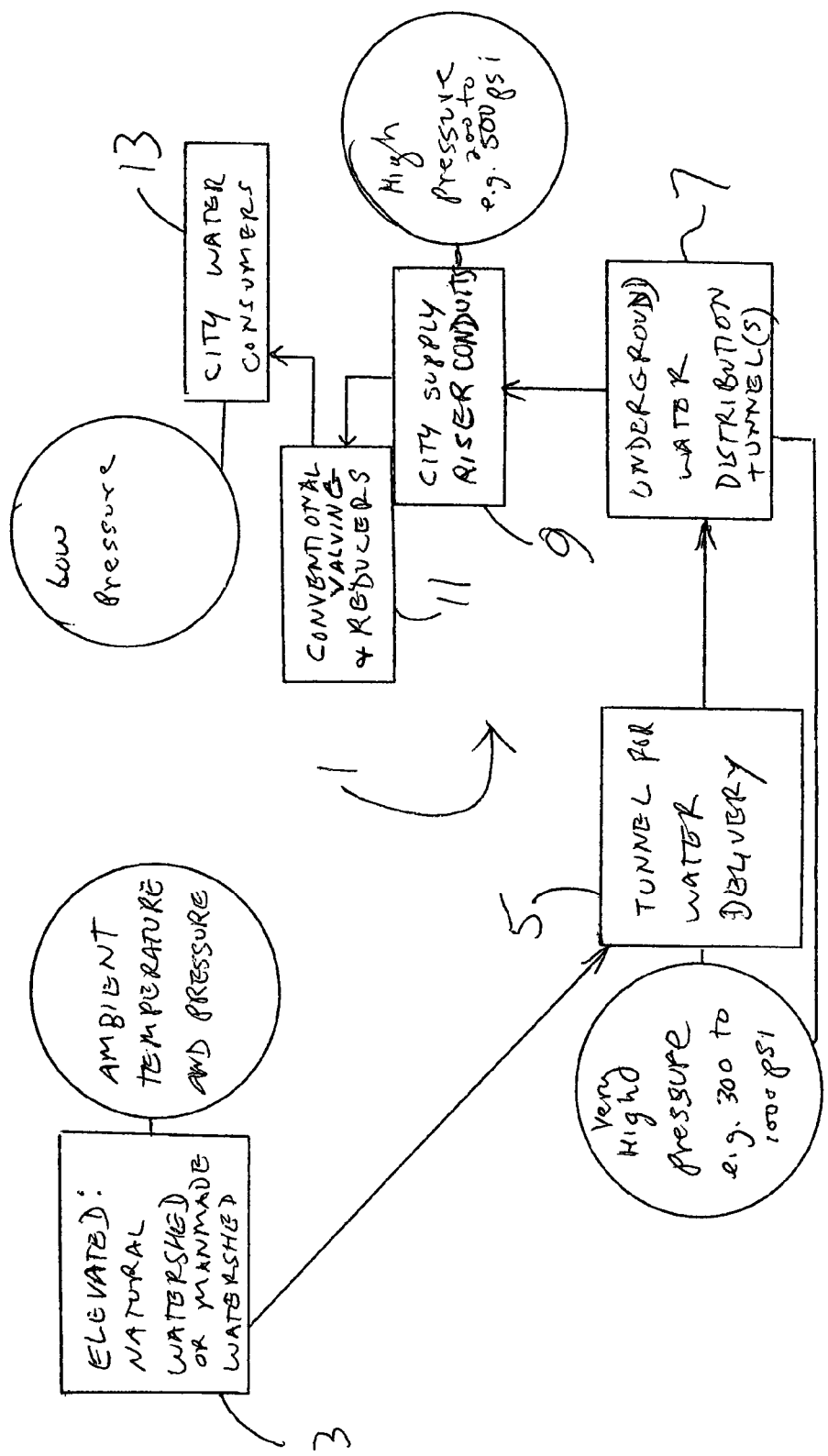
FIG. 1 is a block diagram of a prior art (existing) plan for a municipal water supply.

Referring now to the drawings wherein like reference numerals designate corresponding parts, various examples of the present invention are illustrated.

FIG. 1 is a block diagram of a prior art (existing) plan for a municipal water supply 1. It includes an elevated water source 3, such as a natural or manmade watershed, at a high altitude of at least 500 feet above the community to which the water supply is fed, based on the mean altitude of the community. There is also a tunnel 5 for water delivery from the source 3. Because there is a significant elevational drop of at least 300 feet between the source 3 and the community end of the tunnel 5, the pressure in the tunnel 5 is significant. This pressure may be, for example, 800 psi at the underground water distribution tunnel(s) 7 under the community. When the water under such pressure exits the tunnels and enters riser conduits 9, the pressure decreases due to the decreased head of pressure (decreased differences in altitude, and possibly additional frictional drag, pipe size differences, etc.). In any event, the water may arrive at the top of the riser conduits at lower pressures, but yet too high for distribution into conventional city water lines, e.g., at pressures of at least about 300 psi. These pressures require pressure reducers 11 to reduce the pressure to acceptable city water pressure, e.g., 60 to 30 psi, within the pipes to city water consumers 13.

Figure 2:
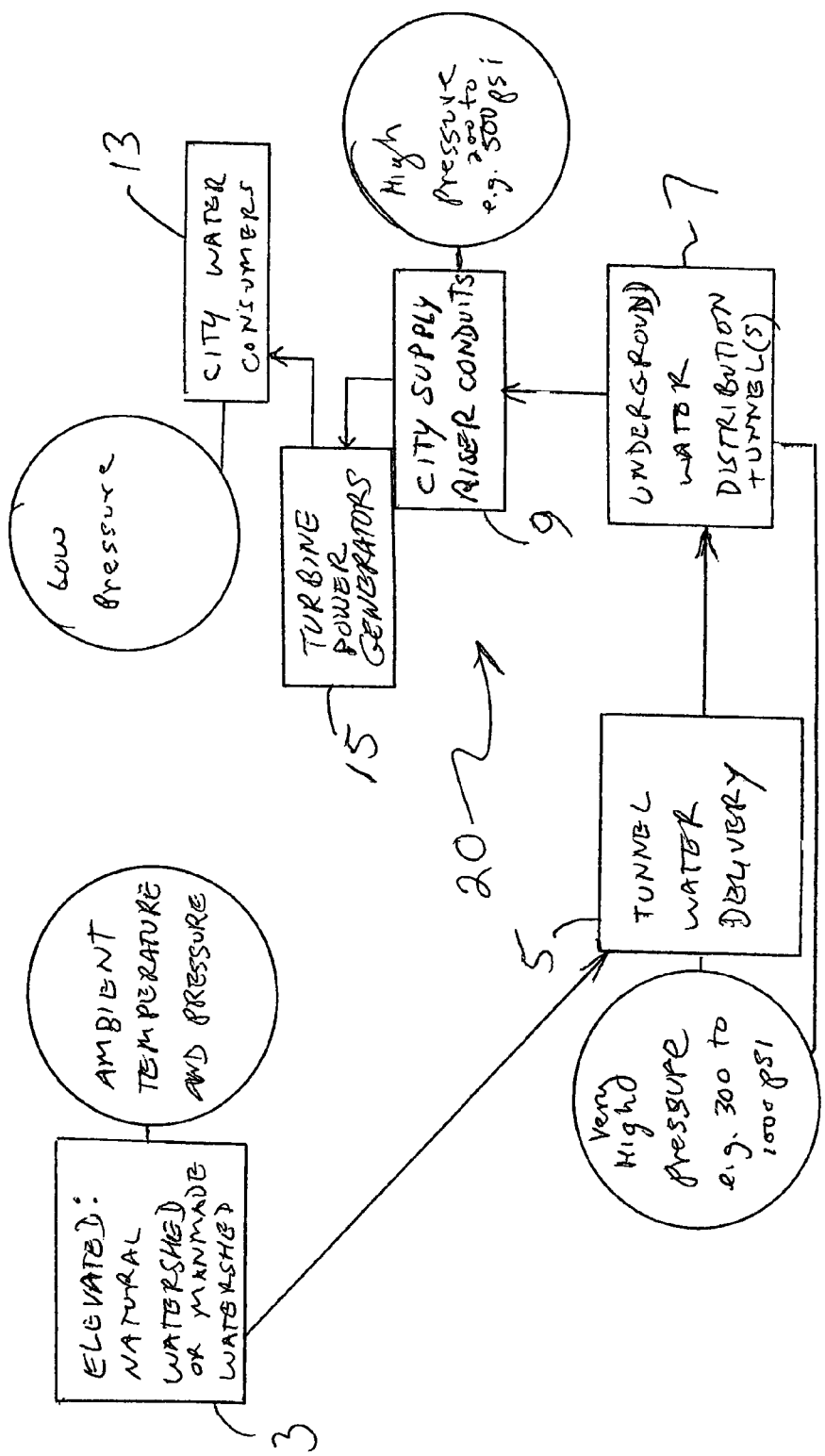
FIG. 2 illustrates a preferred embodiment of the present invention, namely, the installation of one or more turbine generators at the valving subsystems at the tops of the riser conduits of the system shown in FIG. 1.

Unfortunately, the pressure reducers 1 lower the pressure without taking advantages of the available energy. While hydropower systems are well known and water power conversion to electrical power has been used for more than a century, no one has utilized energy within a community water distribution system to generate electrical power in the manner of the present invention. FIG. 2 illustrates a preferred embodiment of the present invention, namely, the installation of one or more turbine generators 15 at the valving subsystems at the tops of the riser conduits. This is progressively more detailed in the Figures that follow. In this FIG. 2, the other components of the system are the same as in FIG. 1 and are identically numbered.

Figure 3:
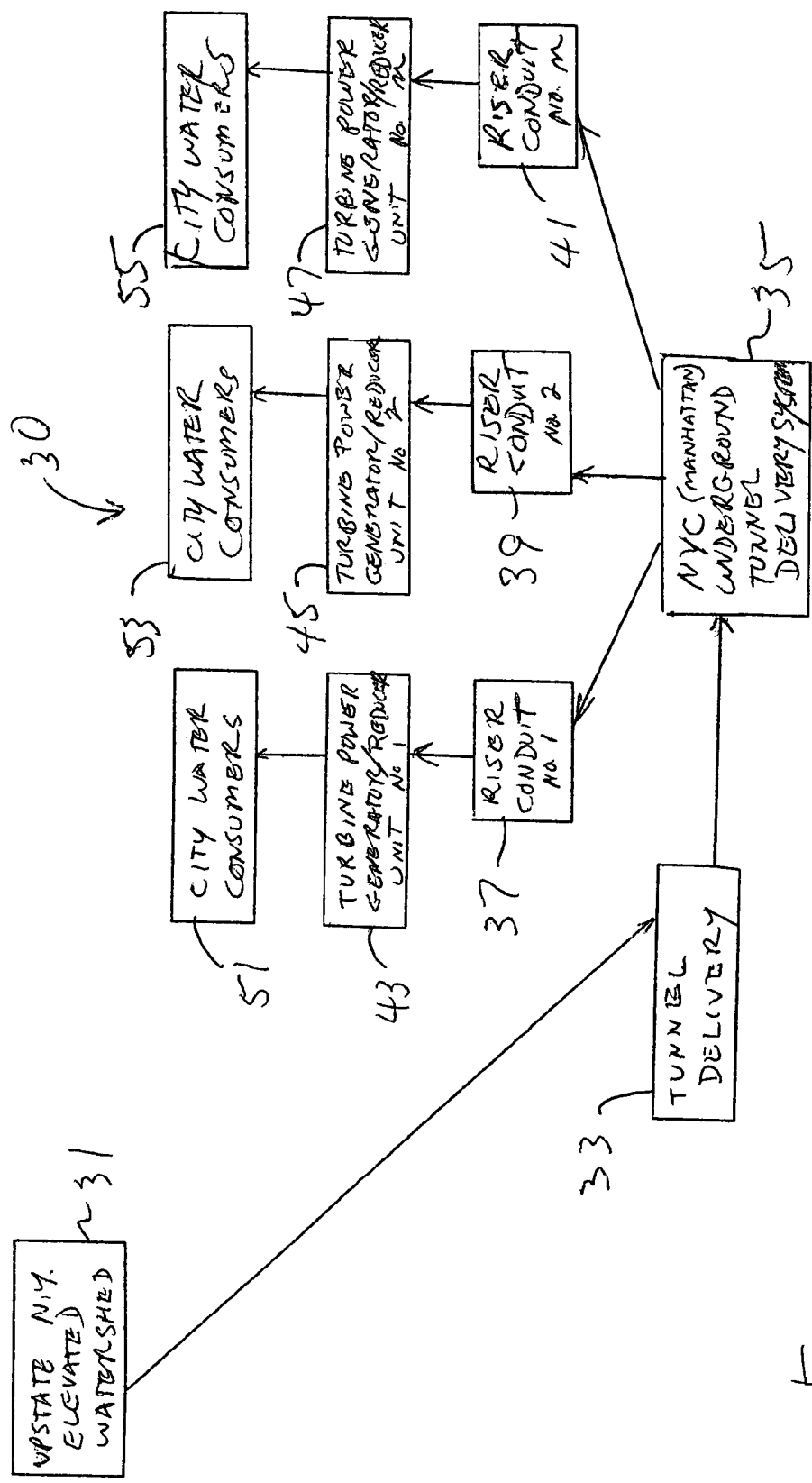
FIG. 3 is a block diagram of the present invention system as it would be retrofitted to the new water supply system of the Boro of Manhattan, New York City.

FIG. 3 is a block diagram of the present invention system 30 as it would be retrofitted to the new water supply system of the Boro of Manhattan, New York City. Here, there is an elevated water supply system, the upstate New York elevated watershed and reservoir supply source 31 at a high altitude of as great as 1000 feet above the community of New York City to which the is fed therefrom via tunnel delivery 33 and into a tunnel or tunnels 35 that have been cut deep into the underground of Manhattan, e.g., as much as 500 feet or more below ground level. These are formidable tunnels that large construction equipment and vehicles have formed. They loop Manhattan in a "U" pattern and have a number of riser conduits such as riser conduits 37, 39 and 41 that deliver the water to the surface. Due to the significant elevational drop of at least 700 feet between the source 31 and the underground tunnel(s) 35, the pressure in the tunnel(s) 35 is about 800 psi to 1000 psi. When the water under such pressure exits the tunnels and enters the riser conduits such as conduit 39, the pressure decreases due to the decreased head of pressure (decreased differences in altitude, and possibly additional frictional drag, pipe size differences, etc.). The water may arrive at the top of the riser conduits at lower pressures of about 400 psi to 600 psi. These pressures are reduced due to the frictional drag and energy necessary to turn the turbine blades of turbine generators 43, 45 and 47 to produce electric power. Additional reducers, breaking valves and/or other pressure adjustment mechanisms may be employed with the turbine generators, as a matter of design, although, shut down means and/or bypasses will be essential for maintenance and repair/replacement of the turbines. After the turbines have taken the energy from the pressurized water, the reduced pressure water is then fed to the city water supply, or reduced or gated further as needed, and then fed to the city water supply pipes for city water consumers 51, 53 and 55. In this manner, the tremendous flow of water into the City of New York will have electricity generating turbines break the flow instead of unproductive pressure reducers.

Figure 4:
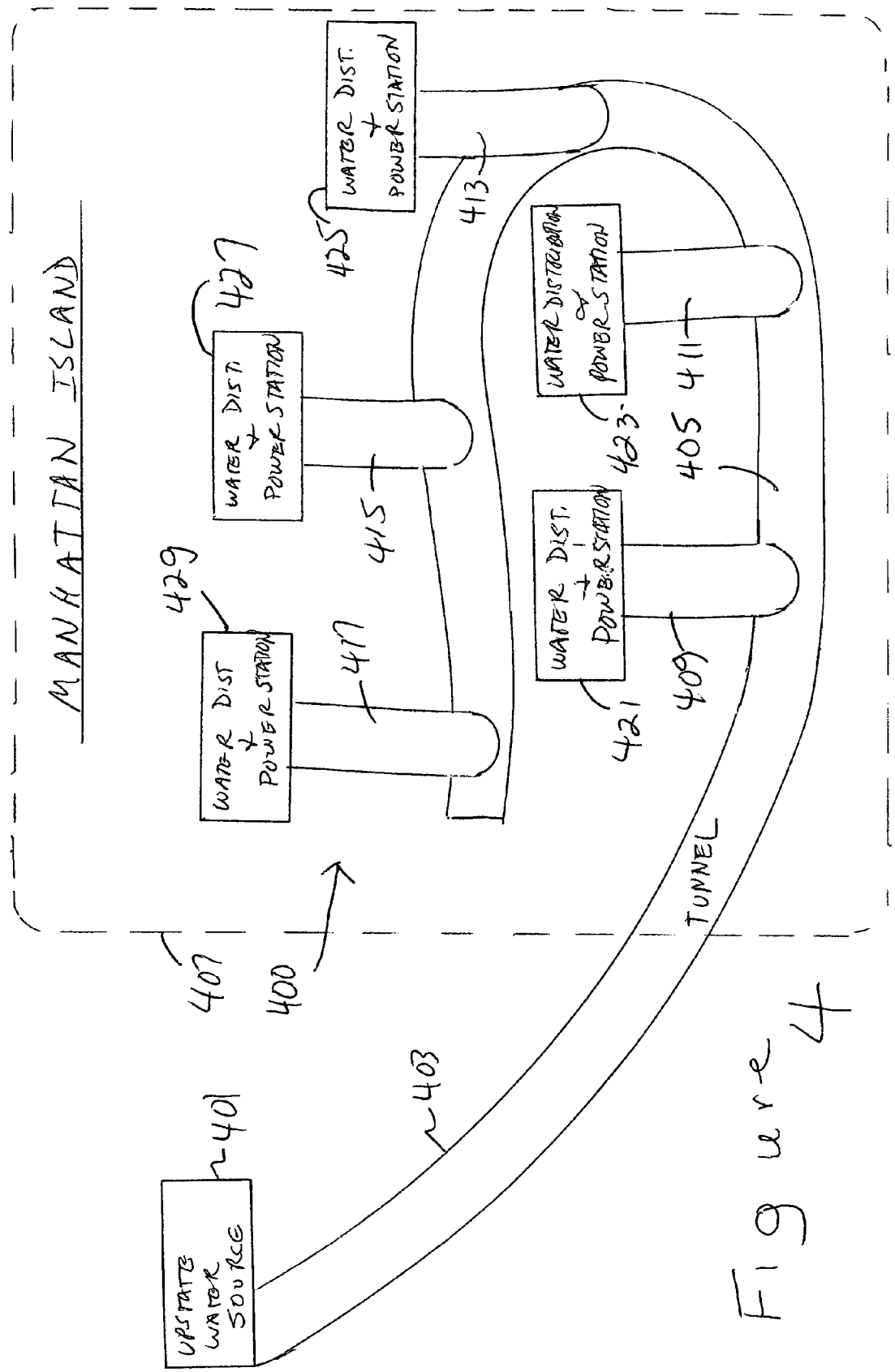
FIG. 4 shows a stylized presentation of the proposed Manhattan water supply tunnel secondary purpose turbine electric power generator system.

FIG. 4 shows a stylized presentation of the proposed Manhattan water supply tunnel secondary purpose turbine electric power generator system 400. The upstate water source 401 feeds tunnel 403 in which water flows downhill hundreds of feet in elevation and many tens of miles into under city tunnel section 405, under Manhattan 407. Riser conduits 409, 422, 423, 425 and 417 have been drilled down into the subterrain from the surface at specific sites around the boro to create outlets for supplying the boro with water. The water is under extremely high pressure and drives one or more turbines prior to distribution throughout the boro at the water distribution and power stations 421, 423, 425, 427 and 429. (Water driven turbines are known and the exact size and type is within the purview of the artisan.) The power generated may be captured by a utility company and sold to the public or dedicated first to power municipal facilities and then sold back to a power company.

Figure 5:
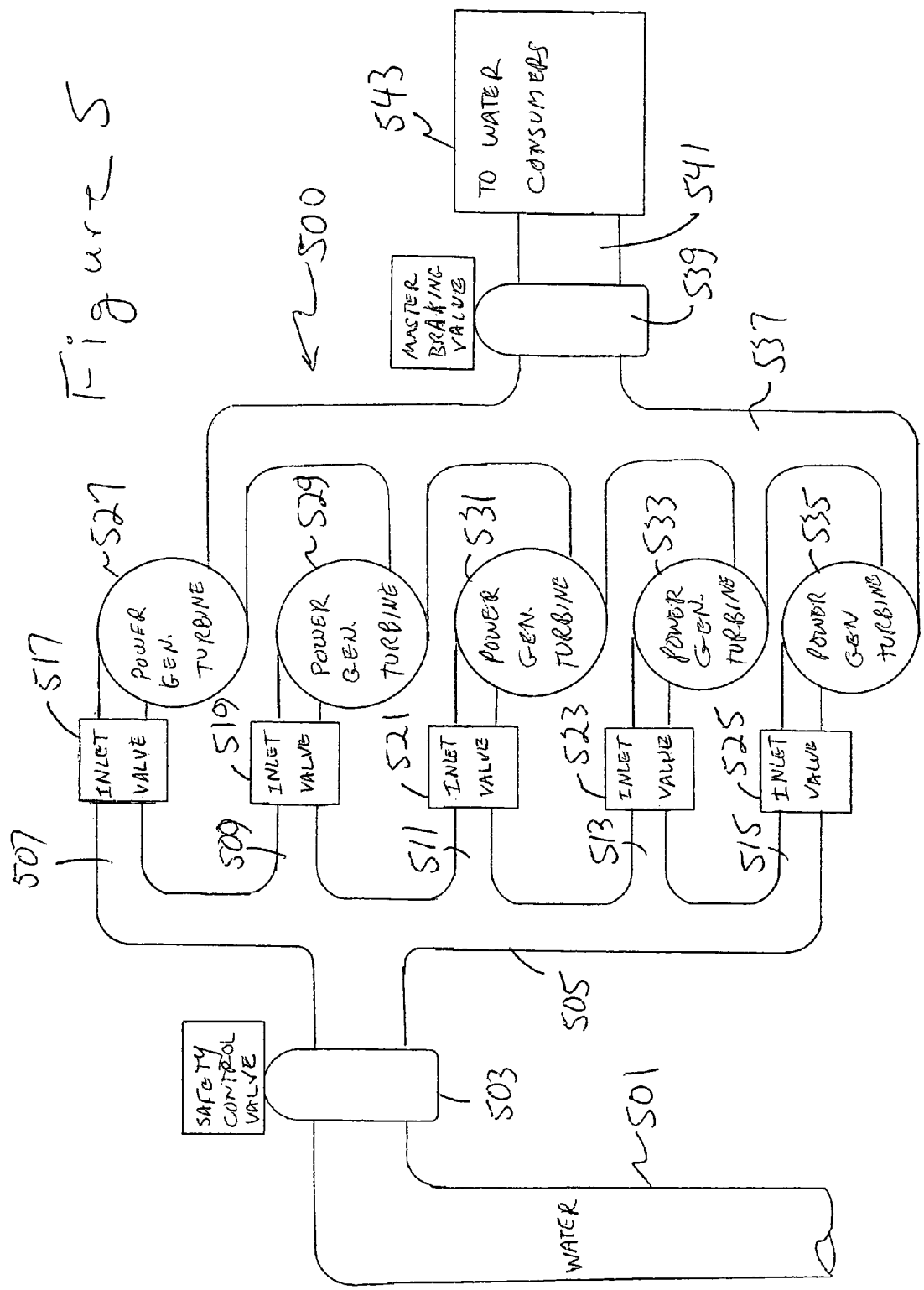
FIG. 5 illustrates a parallel group of turbine generators with manifold system from a single riser conduit.

FIG. 5 illustrates a parallel group of turbine generators with manifold system off a single riser conduit in accordance with one preferred embodiment of the present invention. Riser conduit 501 is illustrated in pipe form and is typically a drilled vertical or slant well hole from the surface to the tunnel system. There is a safety control valve 503 that is a master shut-off as well as a breaking valve upstream from the turbines. Manifold 505 has distributor lines 507, 509, 511, 513 and 525, as shown. These lines are connected to turbines 527, 529, 531, 533 and 535, respectively, each with dedicated inlet valves, namely, valves 517, 519, 521, 523 and 525, respectively to permit any one or combination of lines to be shut down or slowed down without the need to shut down the other lines. The outlet side of the manifold could distribute to separate water lines or recombined at manifold 537 to main pipe 541. Pipe 541 includes a master braking valve 539 and is connected for distribution to water consumers 543, as shown.

Figure 6:
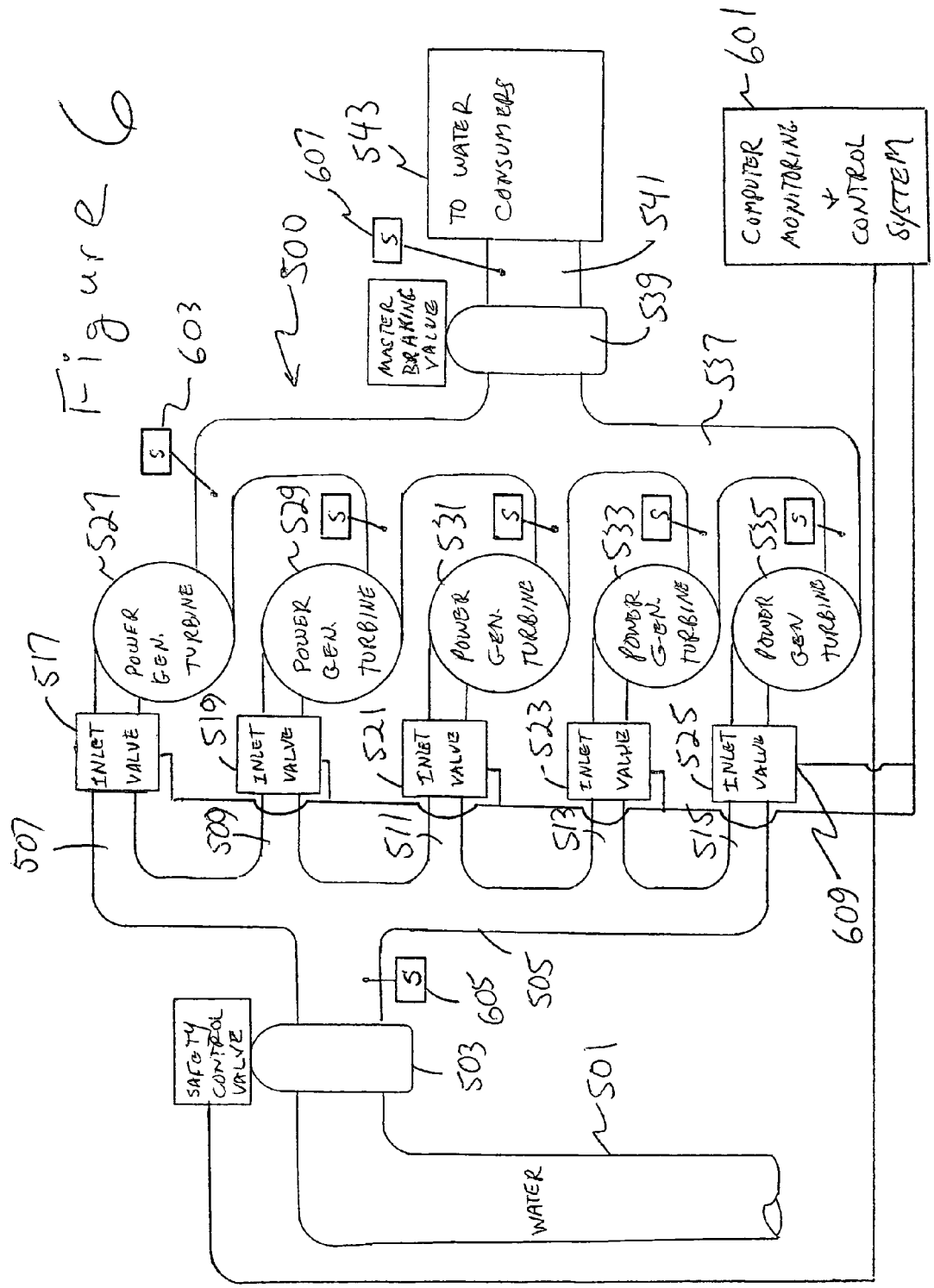
FIG. 6 illustrates the parallel group of turbine generators with manifold system from a single riser conduit shown in FIG. 5, but with a computerized monitoring and control system strategically connected to it; and, FIGS. 7 and 8 illustrate alternative arrangements with turbines aligned in series in the valving subsystem and in riser conduits, respectively

FIG. 6 illustrates the parallel group of turbine generators with manifold system from a single riser conduit shown in FIG. 5, with identical components identically numbered, but with a computerized monitoring and control system 601 strategically connected to it. System 201 has wireless sensors such as main line sensor 605, individual line sensors, such as sensor 603, and outlet main pipe sensor 607. These sensors send continual signals to system 601 and its computer compares the actual data received with preset ranges. When deviations within a certain range from the desired first range as recognized, automatic valving occurs through connections and drives such as drive 609. When deviations are greater a line or system shutdown may occur and alarms or signals to alive monitoring person will be sent. In this manner, if a turbine breaks down or locks up or becomes jammed or bearings wear, the automatic control and monitoring system will prevent further damage and limit pressure spikes.

Figure 7:
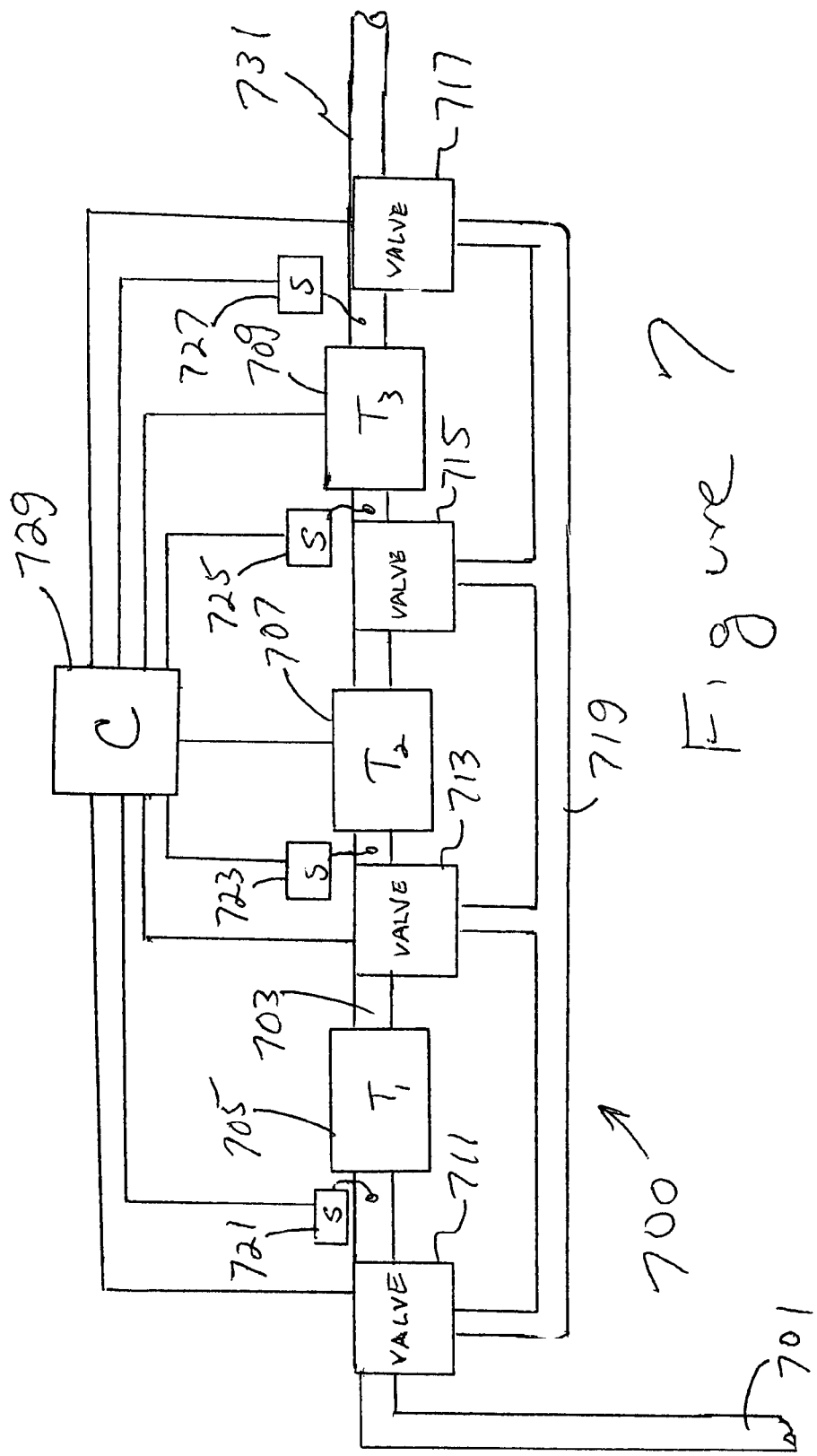

FIG. 7 illustrates an alternative arrangement present invention system 700 with turbines 705, 707 and 709 aligned in series in valving subsystem main line 703 that is taken off riser conduit 701. There is a bypass line 719 and multipositional valves connected thereto in series. Hence, valve 711 is upstream from all components and controls flow to all of the turbines or some or just turbine 705, depending upon the position of the other downstream valves. Valve 713 controls downstream from its position before turbine 707 and, likewise, valve 715 controls downstream from its position before turbine 709. Valve 717 may stop all flow, permit flow only through main line 703, or only through bypass 719, or some combination of both and may control the flow rates in each possible scenario. The water exits into the central water distribution system at exit 713. Control and monitoring computer 729 is connected to sensors 721, 723, 725 and 727, positioned as shown, and is also connected to each of the aforesaid valves. When sensors recognize deviations from preset standards, preprogrammed action is automatically taken. Computer manual override is included wherein an operator may input override commands.

FIG. 8 illustrates another alternative arrangement present invention system 800 with turbines 811, 813 and 815 aligned in series in riser conduit 803 that is taken off tunnel 801. There is a bypass line 825 and multipositional valves connected thereto in series. Hence, valve 817 is upstream from all components and controls flow to all of the turbines or some or just turbine 811, depending upon the position of the other downstream valves. Valve 819 controls downstream from its position before turbine 813 and, likewise, valve 821 controls downstream from its position before turbine 815. Valve 823 may stop all flow, permit flow only through riser conduit 803, or only through bypass 825, or some combination of both and may control the flow rates in each possible scenario. The water exits into the central water distribution system at exit 805. Control and monitoring computer 835 is connected to sensors 827, 829, 831 and 833, positioned as shown, and is also connected to each of the aforesaid valves. When sensors recognize deviations from preset standards, preprogrammed action is automatically taken. Computer manual override is included wherein an operator may input override commands. The turbines generate electricity for either government, public utility resale or both.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A water supply tunnel secondary purpose turbine electric power generator system which comprises:
   a) a water supply subsystem for a community that includes a water source at an elevation that is at least 300 feet above the mean altitude of said community, said water supply subsystem including delivery mechanism for water from said water source to said community that includes a gravity fed underground water tunnel being located, at least in part, upstream from said community, and, at least in part, being located under said community, said water supply subsystem having a plurality of riser conduits in said community connected to said gravity fed underground water tunnel, each of said plurality of riser conduits in said community connected to said gravity fed underground water tunnel, each of said plurality of riser conduits delivering water for said water source to said community at a pressure that is at least 100 psi in excess of desired water pressure delivered to community water lines;
   b) a plurality of water valving subsystems, each of said plurality of water valving subsystems connected to each of said riser conduits and including at least one safety valve to lower a water pressure of said delivered water and including a safety valve for shut-off and braking located downstream from a power generating turbine subsystem; and,
   c) a power generating turbine subsystem, including at least one water driven turbine located in each of said plurality of riser conduits.

2. The water supply tunnel secondary purpose turbine electric power generator system of claim 1, wherein said water pressure within said tunnel at least in its part being located under said community is at least 600 psi.

3. The water supply tunnel secondary purpose turbine electric power generator system of claim 1, wherein said water pressure immediately upstream from each of said water valving subsystems is in excess of 300 psi.

4. The water supply tunnel secondary purpose turbine electric power generator system of claim 1, wherein said water pressure downstream from at least one downstream underwater turbine is less than 100 psi.

5. The water supply tunnel secondary purpose turbine electric power generator system of claim 1, wherein said at least one water driven turbine is located downstream from said at least one safety valve in said water valving subsystem.

6. The water supply tunnel secondary purpose turbine electric power generator system of claim 1, wherein said at least one water driven turbine is located at top of each of said plurality of riser conduits.

7. The water supply tunnel secondary purpose turbine electric power generator system of claim 1, wherein each of said at least one water driven turbine includes a dedicated upstream inlet valve.

8. The water supply tunnel secondary purpose turbine electric power generator system of claim 1, wherein said system further includes a computerized monitoring and control system that includes pressure sensors located within said water valving subsystems and is programmed to automatically valve down water flow in response to sensing a water pressure that exceeds a predetermined threshold pressure.

9. The water supply tunnel secondary purpose turbine electric power generator system of claim 8, wherein said computerized and control system includes at least one sensor downstream from each of said at least one turbine and includes at least one sensor upstream for each of said at least one turbine.

10. The water supply tunnel secondary purpose turbine electric power generator system of claim 1, wherein said water valving subsystems include at least one master breaking valve downstream from each of said at least one turbine.

11. A water supply tunnel secondary purpose turbine electric power generator system which comprises:
   a) a water supply subsystem for a community that includes a water source at an elevation that is at least 300 feet above the mean altitude of said community, said water supply subsystem including delivery mechanism for water from said water source to said community that includes a gravity fed underground water tunnel being located, at least in part, upstream from said community, and, at least in part, being located under said community, said water supply subsystem having a plurality of riser conduits in said community connected to said gravity fed underground water tunnel, each of said plurality of riser conduits in said community connected to said gravity fed underground water tunnel, said riser conduits delivering water for said water source to said community at a pressure that is at least 100 psi in excess of desired water pressure delivered to community water lines;
   b) a plurality of water valving subsystems, each of said plurality of water valving subsystems connected to said riser conduits and including at least one safety valve to lower a water pressure of said delivered water and including a safety valve for shut-off and braking located downstream from a power generating turbine subsystem; and,
   c) said power generating turbine subsystem, including at least one set of a plurality of water driven turbines located at each of said plurality of water valving subsystems, each of said at least one set being connected in series or in parallel to one component selected from the group consisting of one of said riser conduits and one of said plurality of water valving subsystems.

12. The water supply tunnel secondary purpose turbine electric power generator system of claim 11, wherein said water pressure within said tunnel at least in its part being located under said community is at least 600 psi.

13. The water supply tunnel secondary purpose turbine electric power generator system of claim 11, wherein said water pressure immediately upstream from each of said water valving subsystems is in excess of 300 psi.

14. The water supply tunnel secondary purpose turbine electric power generator system of claim 11, wherein said water pressure downstream from at least one downstream underwater turbine is less than 100 psi.

15. The water supply tunnel secondary purpose turbine electric power generator system of claim 11, wherein said at least one water driven turbine is located downstream from said at least one safety valve in said water valving subsystem.

16. The water supply tunnel secondary purpose turbine electric power generator system of claim 11, wherein each of said plurality of water driven turbines is located at top of each of said plurality of riser conduits.

17. The water supply tunnel secondary purpose turbine electric power generator system of claim 11, wherein each of said at least one water driven turbine includes a dedicated upstream inlet valve.

18. The water supply tunnel secondary purpose turbine electric power generator system of claim 11, wherein said system further includes a computerized monitoring and control system that includes pressure sensors located within said water valving subsystems and is programmed to automatically valve down water flow in response to sensing a water pressure that exceeds a predetermined threshold pressure.

19. The water supply tunnel secondary purpose turbine electric power generator system of claim 18, wherein said computerized and control system includes at least one sensor downstream from each of said at least one turbine and includes at least one sensor upstream for each of said at least one turbine.

20. The water supply tunnel secondary purpose turbine electric power generator system of claim 11, wherein said water valving subsystems include at least one master breaking valve downstream from each of said at least one turbine.

* * * * *